(12) United States Patent
Wang et al.

(10) Patent No.: US 11,585,942 B2
(45) Date of Patent: Feb. 21, 2023

(54) DETECTION OF GNSS INTERFERENCE USING SURVEILLANCE MESSAGES

(71) Applicant: Honeywell International Inc., Charlotte, NC (US)

(72) Inventors: Guoqing Wang, Beijing (CN); Xiao Cao, Shanghai (CN); Ping Ye, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 297 days.

(21) Appl. No.: 17/080,419

(22) Filed: Oct. 26, 2020

(65) Prior Publication Data

US 2023/0017616 A1 Jan. 19, 2023

(51) Int. Cl.
*G01S 19/21* (2010.01)

(52) U.S. Cl.
CPC ............ *G01S 19/215* (2013.01); *G01S 19/21* (2013.01)

(58) Field of Classification Search
CPC .............................. G01S 19/21; G01S 19/215
See application file for complete search history.

(56) References Cited

U.S. PATENT DOCUMENTS

| | | | |
|---|---|---|---|
| 9,476,962 B2 | 10/2016 | Murphy et al. | |
| 9,910,160 B2 | 3/2018 | Geren et al. | |
| 10,137,863 B2 | 11/2018 | Johnson | |
| 10,365,374 B2 | 7/2019 | Murphy et al. | |
| 10,408,942 B2 | 9/2019 | Kim et al. | |
| 10,457,249 B2 | 10/2019 | Johnson | |
| 10,495,759 B2 | 12/2019 | Leibner et al. | |
| 10,573,185 B2 | 2/2020 | Scarlatti et al. | |
| 10,762,792 B2* | 9/2020 | Ballestros | G08G 5/0021 |
| 2010/0149019 A1 | 6/2010 | Smith et al. | |
| 2011/0163908 A1* | 7/2011 | Andersson | G08G 5/0008 342/36 |

(Continued)

FOREIGN PATENT DOCUMENTS

| | | |
|---|---|---|
| CN | 105929416 A | 9/2016 |
| EP | 3379295 A1 | 9/2018 |

OTHER PUBLICATIONS

Response to Extended Search Report dated Mar. 22, 2022, from counterpart European Application No. 21204518.1 filed May 23, 2022, 31 pp.

(Continued)

*Primary Examiner* — Cassi J Galt
(74) *Attorney, Agent, or Firm* — Shumaker & Sieffert, P.A.

(57) ABSTRACT

In some examples, a system includes a transceiver configured to receive surveillance messages from Y target vehicles, where Y is an integer greater than two. The system includes processing circuitry configured to determine predicted positions of the Y target vehicles based on the surveillance messages. The processing circuitry is also configured to determine reported positions of the Y target vehicles based on later received surveillance messages. The processing circuitry is further configured to determine that respective differences between the respective predicted position and the respective reported position for X of the Y target vehicles is greater than a threshold distance. The processing circuitry is configured to determine that Global Navigation Satellite System interference has occurred in response to determining that X divided by Y is greater than a threshold level.

20 Claims, 5 Drawing Sheets

(56) References Cited

U.S. PATENT DOCUMENTS

| | | |
|---|---|---|
| 2012/0041620 A1 | 2/2012 | Stayton et al. |
| 2013/0310068 A1 | 11/2013 | Fischer et al. |
| 2015/0331099 A1 | 11/2015 | Wu et al. |
| 2016/0155342 A1 | 6/2016 | Gibson et al. |
| 2017/0227650 A1 | 8/2017 | Grobert |
| 2018/0172797 A1 | 6/2018 | Hauswald et al. |
| 2018/0196140 A1 | 7/2018 | Garcia et al. |

OTHER PUBLICATIONS

Semanjski et al., "Use of Supervised Machine Learning for GNSS Signal Spoofing Detection with Validation on Real-World Meaconing and Spoofing Data—Part 1," Sensors, vol. 20, No. 7, Feb. 2020, 20 pp.

Tippenhauer et al., "On the Requirements for Successful GPS Spoofing Attacks," CCS '11: Proceedings of the 18th ACM Conference on Computer and Communications Security, Oct. 2011, 11 pp.

Zhou et al., "Calculation of the lower limit of the spoofing-signal ratio for a GNSS receiver-spoofer," EURASIP Journal on Wireless Communications and Networking, Article No. 44, Feb. 2018, 12 pp.

Extended Search Report from counterpart European Application No. 21204518.1 dated Mar. 22, 2022, 10 pp.

\* cited by examiner

DETECTION OF GNSS INTERFERENCE USING SURVEILLANCE MESSAGES

TECHNICAL FIELD

This disclosure relates to Global Navigation Satellite System devices and surveillance communication for vehicles.

BACKGROUND

A Global Navigation Satellite System (GNSS) device mounted on a vehicle can experience unintentional interference (e.g., radio-frequency interference) and/or intentional interference (e.g., be spoofed by a malicious transmitter that sends false GNSS signals). The GNSS device that receives an interfered GNSS signal or a spoofed GNSS signal may determine an incorrect position for the vehicle on which the GNSS device is mounted. Consequently, other systems onboard the vehicle, such as terrain awareness and warning systems and collision avoidance systems, are more likely to generate a nuisance alert (e.g., a false alarm) if the GNSS device determines an incorrect position for the vehicle based on interfered signals (e.g., spoofed signals).

SUMMARY

In general, this disclosure relates to detecting Global Navigation Satellite System (GNSS) interference (e.g., spoofing) using surveillance messages. A system of this disclosure may be configured to determine that GNSS interference has occurred in response to determining that a surveillance message from at least one vehicle includes a discrepancy. The system can determine that a surveillance message includes a discrepancy by performing a test on the surveillance message, where example tests include a position filter, a time validation, and a range validation. In some examples, the system is configured to determine that GNSS interference has occurred in response to determining that surveillance messages received from X out of Y vehicles include a discrepancy, where X/Y is greater than a threshold level.

For example, the system may be configured to implement a position filter by determining a predicted position for a target vehicle based on a previous surveillance message received from the target vehicle. The system may be configured to detect GNSS interference by determining that a difference between a reported position and the predicted position is greater than a threshold distance, where the reported position is based on a second surveillance message, and where the second surveillance message and the previous surveillance message are received in consecutive seconds. Additionally or alternatively, the system may be configured to implement a range validation test and/or a time validation test by determining the distance (e.g., range) between an ownship vehicle and the reported position of a target vehicle. In the range validation test, the system can determine an estimated range to the target vehicle based on the round-trip time for a surveillance message and determine whether the estimated range is greater than an acceptable distance. In the time validation test, the system may be configured to then determine an acceptable time window for the round-trip time of a surveillance message based on the distance between the vehicles. The system may be configured to detect GNSS interference in response to determining that the round-trip time for a surveillance message is outside of the acceptable time window.

In some examples, a system includes a transceiver configured to receive surveillance messages from Y target vehicles, where Y is an integer greater than two. The system includes processing circuitry configured to determine predicted positions of the Y target vehicles based on the surveillance messages. The processing circuitry is also configured to determine reported positions of the Y target vehicles based on later received surveillance messages. The processing circuitry is further configured to determine that respective differences between the respective predicted position and the respective reported position for X of the Y target vehicles is greater than a threshold distance. The processing circuitry is configured to determine that GNSS interference has occurred in response to determining that X divided by Y is greater than a threshold level.

In some examples, a method includes receiving, by a transceiver, surveillance messages from Y target vehicles, wherein Y is an integer greater than two. The method also includes receiving, by the transceiver, a second set of surveillance messages from the Y target vehicles after receiving the first set of surveillance messages. The method further includes determining, by processing circuitry, predicted positions of the Y target vehicles based on the first set of surveillance messages. The method includes determining, by the processing circuitry, reported positions of the Y target vehicles based on the second set of surveillance messages. The method also includes determining, by the processing circuitry, that respective differences between the respective predicted position and the respective reported position for X of the Y target vehicles is greater than a threshold distance. The method includes determining, by the processing circuitry, that GNSS interference has occurred in response to determining that X divided by Y is greater than a threshold level.

In some examples, a system includes a transceiver configured to receive surveillance messages from Y target vehicles, transmit one or more interrogation messages to the Y target vehicles, and receive a set of reply messages from the Y target vehicles, where Y is an integer greater than two. The system also include processing circuitry configured to determine reported positions of the Y target vehicles based on the first set of surveillance messages and determine a first set of range estimates for the Y target vehicles based on the reported positions of the Y target vehicles. The processing circuitry is also configured to determine a second set of range estimates for the Y target vehicles based on round-trip times for each interrogation message of the one or more interrogation messages and each respective message of the set of reply messages. The processing circuitry is further configured to determine that a difference between a first respective range estimate of the first set of range estimates and a second respective range estimate of the second set of range estimates for X of the Y target vehicles is greater than a second threshold distance. The processing circuitry is further configured to determine that GNSS interference has occurred in response to determining that X divided by Y is greater than a threshold level.

The details of one or more examples of the disclosure are set forth in the accompanying drawings and the description below. Other features, objects, and advantages will be apparent from the description, drawings, and claims.

DETAILED DESCRIPTION

Figure 1:
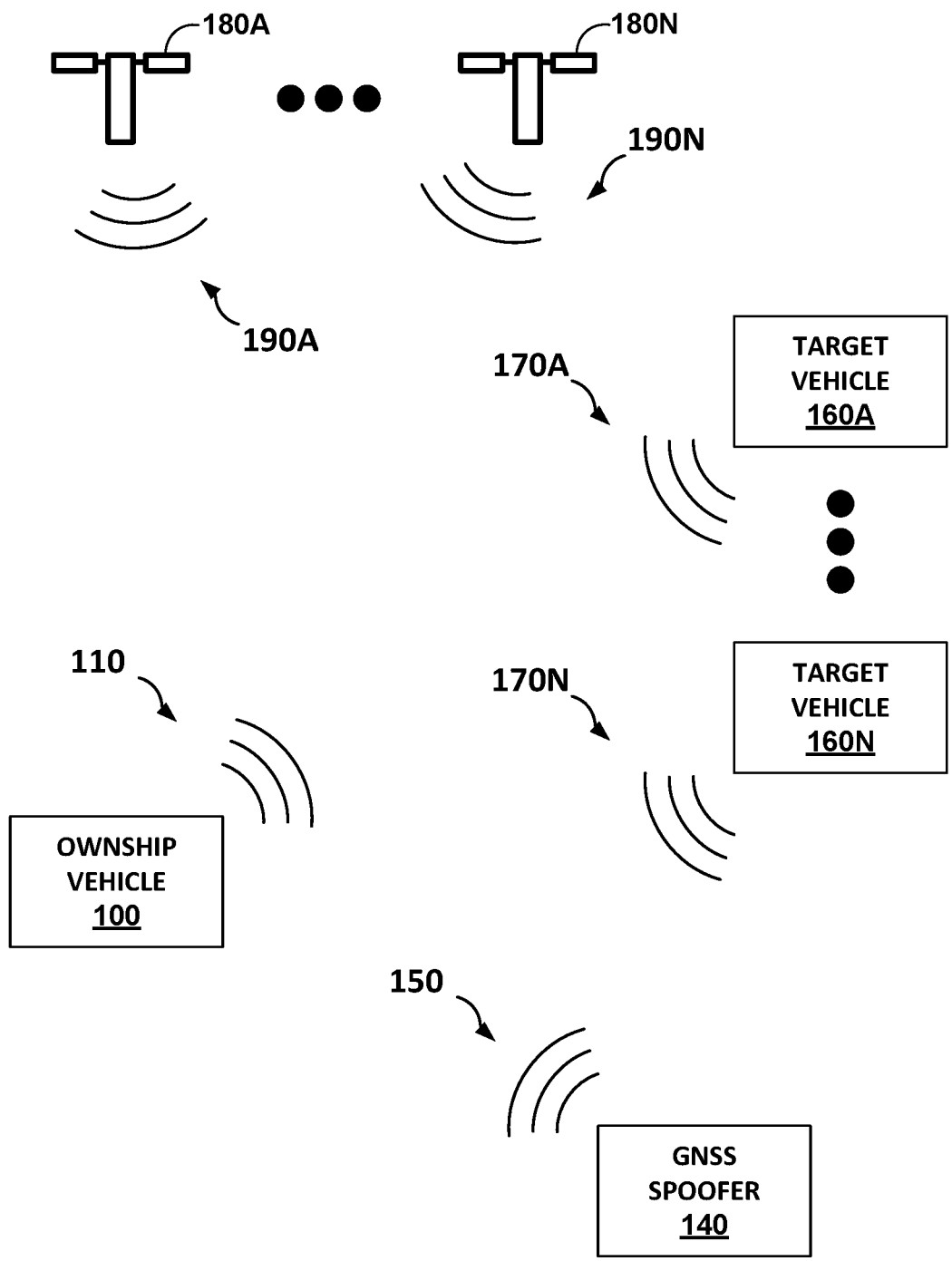
FIG. 1 is a conceptual block diagram of vehicles transmitting and receiving surveillance messages, in accordance with some examples of this disclosure.

Various examples are described below for detecting Global Navigation Satellite System (GNSS) interference (e.g., spoofing) using surveillance signals. Interfered GNSS signals (e.g., radio-frequency (RF) interfered signals and/or maliciously false GNSS signals) can cause a system mounted onboard a vehicle to determine an incorrect position for the vehicle. The vehicle may then transmit a surveillance message to other vehicles, where the transmitted surveillance message encodes an incorrect position.

As described herein, a system mounted on an ownship vehicle may be able to detect GNSS interference of the ownship vehicle and/or target vehicle based on a surveillance message received from the target vehicle. For example, in response to determining that the surveillance message includes a discrepancy between a predicted result and a later surveillance message, the system may be configured to determine that the ownship vehicle and/or the target vehicle received interfered/spoofed GNSS signals. The system may be configured to detect a discrepancy in a surveillance message by determining that the surveillance message fails a test such as a position filter, a time validation, or a range validation. The system can apply a position filter by determining a predicted future position for a target vehicle based on the data encoded in a surveillance message received from the target vehicle. The system may be configured to compare the predicted position to a newly reported position encoded in a later surveillance message. If the reported position changes quickly (e.g., the reported position jumps), the system can determine that the surveillance message includes a discrepancy.

Additionally or alternatively, the system may be configured to apply a time validation by determining an acceptable time window for round-trip times based on the reported position of the target vehicle. The system may transmit an interrogation message to a target vehicle and receive a reply message from the target vehicle. The system can compare the round-trip time of the interrogation message and the reply message to the acceptable time window to determine whether the reported position of the target vehicle includes a discrepancy. Additionally or alternatively, the system may be configured to perform a range validation by determining a first range estimate based on a position reported by a target vehicle and determining a second range estimate based on the round-trip time of an interrogation message sent to the target vehicle and a reply message received from the target vehicle. The system may perform the range validation by determining whether the reported position includes a discrepancy by determining whether the first and second range estimates are within tolerance. In response to determining that a surveillance message received from the target vehicle includes a discrepancy, the system may be configured to determine that the ownship vehicle and/or the target vehicle has received interfered GNSS signals (e.g., spoofed GNSS signals).

FIG. 1 is a conceptual block diagram of vehicles 100 and 160A-160N transmitting and receiving surveillance messages 110 and 170A-170N, in accordance with some examples of this disclosure. The situation depicted in FIG. 1 may include any number of GNSS spoofers 140, vehicles 160A-160N, and GNSS transmitters 180A-180N. FIG. 1 also depicts GNSS spoofer 140 transmitting spoofed GNSS signals 150 and GNSS transmitters 180A-180N transmitting positioning signals 190A-190N. Additionally or alternatively, the situation depicted in FIG. 1 may include non-moving entities, such as base stations or traffic control systems, that can transmit surveillance messages. Example traffic control systems include Air Traffic Controller systems and autonomous vehicle traffic management systems.

Although this disclosure describes examples of aircraft transmitting and receiving surveillance messages, each of vehicles 100 and 160A-160N may include any type of vehicle. In some examples, vehicles 100 and 160A-160N may be aircraft such as unmanned aerial vehicles, airplanes, helicopters, and/or weather balloons. Vehicles 100 and 160A-160N may be space vehicles such as satellites or spaceships, land vehicles such as automobiles, and/or water vehicles such as ships or submarines. Vehicles 100 and 160A-160N may be manned vehicles or unmanned vehicles, such as drones, remote-control vehicles, urban air mobility systems, or any vehicles with or without a pilot or crew on board. The term "ownship" denotes that ownship vehicle 100 is equipped with a system of this disclosure configured to determine that GNSS interference has occurred.

Vehicles 100 and 160A-160N may be configured to transmit and receive surveillance messages 110 and 170A-170N using one or more communication protocols such as traffic collision avoidance system (TCAS), automatic-dependent surveillance-broadcast (ADS-B), transponder protocol, universal access transceiver (UAT), automatic identification system (AIS), and/or any other type of position reporting, including a reporting protocol for automobiles. For example, ownship vehicle 100 may be configured to send a surveillance message as an interrogation message requesting information from vehicles 160A-160N, a reply message to an interrogation message received from one of vehicles 160A-160N, and/or a broadcast message.

In some examples, the interrogation message is a TCAS Mode C interrogation message. A broadcast message may be an unprompted message including position and velocity data sent by a vehicle at, for example, a regular interval. Likewise, ownship vehicle 100 may receive surveillance messages from vehicles 160A-160N that are interrogations, replies, and/or broadcasts. Each surveillance message may encode data within a predefined frequency band, although surveillance messages may not carry or encode any surveillance information in some examples. In some examples, the surveillance messages sent by vehicles 160A-160N may be ADS-B messages and/or transponder reply messages in response to the TCAS interrogation messages sent by ownship vehicle 100.

Each of surveillance messages 110 and 170A-170N may include a data packet or a payload with data such as the location and/or velocity of the transmitting entity, where the location may include the latitude, longitude, and altitude of a vehicle. The data in each packet may also include information such as the origin and destination, the heading, and the type (e.g., Boeing 737, Airbus A320, Freightliner CL, Ford F150, DJI Phantom, etc.) of transmitting entity. Each of surveillance messages 110 and 170A-170N may be a periodic, unprompted broadcast, an interrogation message, and/or a reply to an interrogation message.

A positioning device onboard vehicle 100 can receive positioning signals 190A-190N from GNSS transmitters 180A-180N. GNSS transmitters 180A-180N are depicted in FIG. 1 as satellites, but GNSS transmitters 180A-180N may be any type of GNSS transmitter, such as a ground-based transmitter or another type of air-based transmitter. The positioning device onboard vehicle 100 is configured to determine the location of vehicle 100 based on positioning signals 190A-190N received by vehicle 100. Positioning signals 190A-190N may include location data for GNSS transmitters 180A-180N and clock data for the time of transmission by GNSS transmitters 180A-180N. The location data for one of GNSS transmitters 180A-180N may include three coordinates for the respective one of GNSS transmitters 180A-180N. A positioning device onboard vehicle 100 may be configured to determine the location of vehicle 100 based on the location data and clock data in positioning signals 190A-190N.

The positioning devices onboard vehicles 100 and 160A-160N may experience interference when receiving positioning signals 190A-190N. For example, other nearby transmitters may emit RF energy that unintentionally corrupts the energy of positioning signals 190A-190N as received by vehicles 100 and 160A-160N. The interference or corruption may be narrow-band interference and/or wide-band interference. The corruption or interference of positioning signals 190A-190N can cause the positioning devices onboard vehicles 100 and 160A-160N to determine incorrect positions.

In addition, GNSS spoofer 140 transmits false GNSS signals 150 to vehicles 100 and 160A-160N, which can cause the positioning devices onboard vehicles 100 and 160A-160N to determine incorrect positions. For example, if vehicle 100 receives spoofed GNSS signals 150, the positioning device onboard vehicle 100 may not identify spoofed GNSS signals 150 as false. Similarly, if vehicle 100 receives unintentionally interfered signals, the positioning device onboard vehicle 100 may not identify the GNSS signals as false. Consequently, the positioning device may determine an incorrect position for vehicle 100.

Vehicle 100 may include a receiver autonomous integrity monitor (RAIM) for assessing the integrity of GNSS signals 190A-190N. However, a RAIM function may not detect GNSS interference in all examples, resulting in an incorrect position determination being used by other vehicle systems. An avionics system onboard vehicle 100 may determine, for example, that vehicle 100 is traveling too close to the ground surface and may generate an inaccurate alert based on an incorrect determination of the position of vehicle 100. Additionally or alternatively, one or more of vehicles 160A-160N may have received spoofed GNSS signals 150, and thus the data encoded in surveillance messages 160A-160N may be inaccurate.

In accordance with the techniques of this disclosure, a system onboard vehicle 100 may be configured to use the surveillance messages received from one or more of vehicles 160A-160N to determine whether GNSS interference. For example, the system may determine that GNSS interference has occurred in response to determining that surveillance message 170A received from vehicle 160A includes a discrepancy. The system may determine that vehicle(s) 100 and/or 160A has received spoofed GNSS signals 150 based on the nature of the discrepancy. Based the locations of each vehicle, and which vehicles are transmitting surveillance messages with discrepancies, the system can isolate which vehicles have received interfered GNSS signals. Additional example details of determining GNSS interference are described in commonly assigned U.S. Pat. No. 10,137,863, entitled "Detecting False Positioning Signals Based on Surveillance Signals," issued on Nov. 27, 2018, the entire contents of which are incorporated herein by reference.

An existing system may discard a surveillance message after determining that the message contains a discrepancy. However, instead of just discarding a message with a discrepancy, the system onboard vehicle 100 may be configured to use discrepant message to determine whether vehicle 100 and/or the transmitting vehicle is a target of GNSS interference by GNSS spoofer 140. An existing system may be able to implement the techniques of this disclosure with a software upgrade or retrofit. In addition, a system of this disclosure may be configured to satisfy minimum operating standards because spoofing mitigation techniques can be used once the system has determined that a positioning device onboard vehicle 160 has been spoofed.

Additionally or alternatively, the system may be configured to set a threshold percentage of vehicles 160A-160N at which the system may determine that GNSS interference has occurred. The system onboard vehicle 100 may determine that a transmitting vehicle has received interfered GNSS signals in response to determining that at least a threshold percentage of vehicles 160A-160N fail one of the tests described herein (e.g., a position filter, a time validation, a range validation, etc.). For example, if the system onboard vehicle 100 is receiving surveillance messages from Y total vehicles, then the system may determine that GNSS interference has occurred if X of the Y vehicles fail the test, and X divided by Y is greater than a threshold level.

In other words, the system may be configured to count the total number of transmitting vehicles 160A-160N within range, count the number of vehicles 160A-160N that fail a test, and then divide the two counts. Using a threshold percentage may help in identifying and diagnosing a situation where only one vehicle has a surveillance transceiver or positioning device with a defect or error, rather than a GNSS interference issue. In response to determining that a threshold percentage of vehicles failed one of the tests, the system may be configured to suppress an alert generated by a terrain awareness and warning system or by a proximity warning system because such an alert may be based on an inaccurate determination of the position of vehicle 100.

Figure 2:
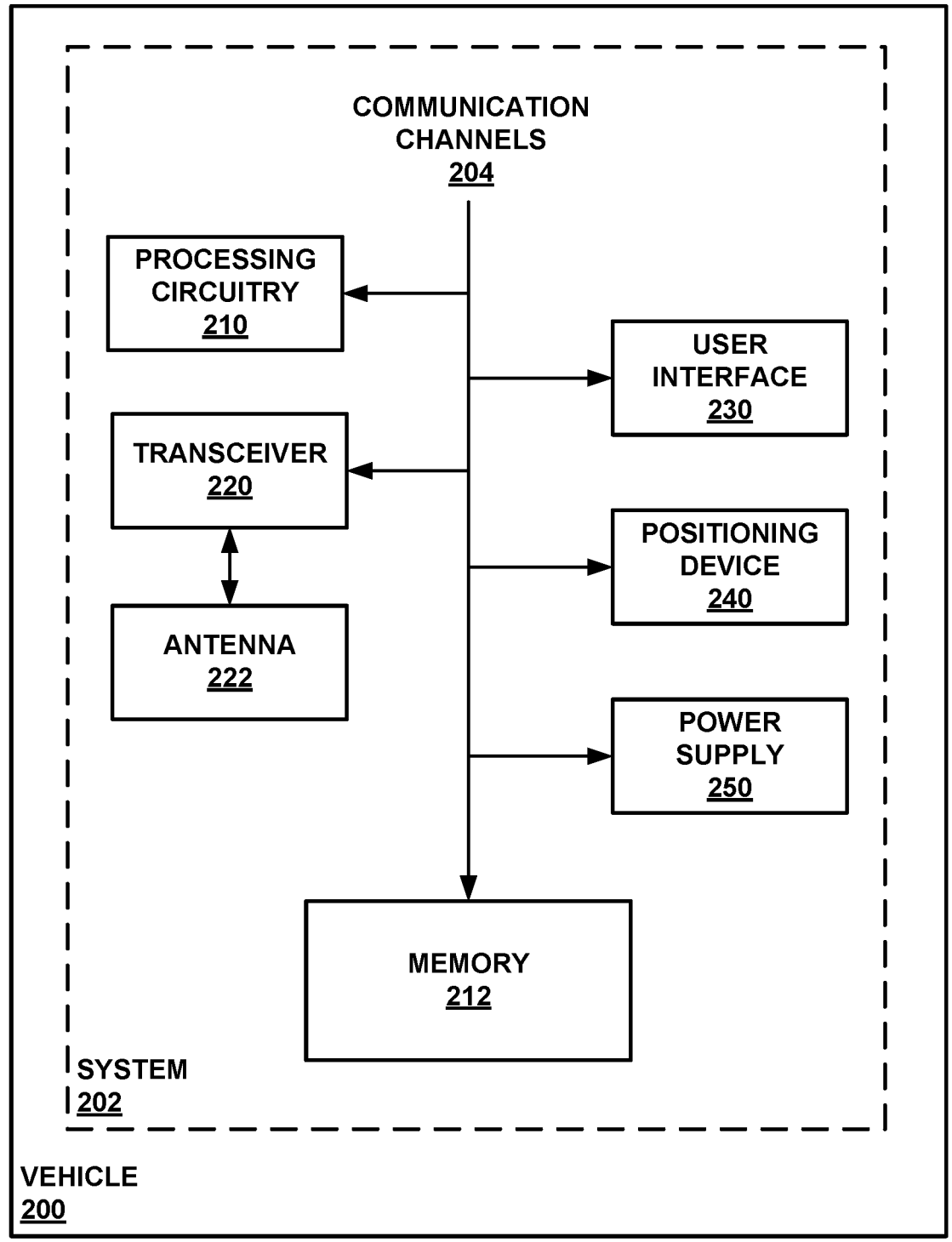
FIG. 2 is a conceptual block diagram of a system including processing circuitry, a transceiver, and a positioning device, in accordance with some examples of this disclosure.

FIG. 2 is a conceptual block diagram of a system 202 including processing circuitry 210, a transceiver 220, and a positioning device 240, in accordance with some examples of this disclosure. In the example shown in FIG. 2, system 202 is mounted onboard vehicle 200. For example, system 202 may be mounted in the avionics bay of vehicle 200. In the example shown in FIG. 2, system 202 includes memory 212, user interface 230, and power supply 250. System 202 includes communication channels 204 connecting the components of system 202 such that any component may be configured to communicate with any other component of system 202. System 202 can also include optional components such as an inertial navigation system (INS) and sensors, even though these components are not shown in FIG. 2.

Processing circuitry 210 may be configured to determine the location of vehicle 200 based on a surveillance message using, for example, time difference of arrival and/or multi-lateration techniques. Processing circuitry 210 may also be configured to output an alert or a warning signal via transceiver 220 and/or user interface 230 in response to determining that GNSS interference has occurred. For example, processing circuitry 210 may be configured to output a warning signal by causing transceiver 220 to transmit a message to other vehicles and/or to a base station (e.g., a traffic controller) indicating that GNSS interference has occurred. Processing circuitry 210 may also be configured to output the alert or warning signal to a flight management system or a travel management system.

Additionally or alternatively, processing circuitry 210 may be configured to output a warning signal by causing user interface 230 to output information (e.g., text, visual indication, and/or audio) to the operator of vehicle 200. The warning signal may include information on which vehicles have sent surveillance messages that include discrepancies, as determined by processing circuitry 210. The warning signal may also include information on the discrepant surveillance messages including the predicted positions, reported positions, acceptable time windows, round-trip times, range estimates, and so on.

Processing circuitry 210 may include any suitable arrangement of hardware, software, firmware, or any combination thereof, to perform the techniques attributed to processing circuitry 210 herein. Examples of processing circuitry 210 include any one or more microprocessors, digital signal processors (DSPs), application specific integrated circuits (ASICs), field programmable gate arrays (FPGAs), or any other equivalent integrated or discrete logic circuitry, as well as any combinations of such components. When processing circuitry 210 includes software or firmware, processing circuitry 210 further includes any hardware for storing and executing the software or firmware, such as one or more processors or processing units.

Processing circuitry 210 may be communicatively coupled to memory 212, which is configured to store data. Memory 212 may include any volatile or non-volatile media, such as a random access memory (RAM), read only memory (ROM), non-volatile RAM (NVRAM), electrically erasable programmable ROM (EEPROM), flash memory, and the like. In some examples, memory 212 may be external to processing circuitry 210 (e.g., may be external to a package in which processing circuitry 210 is housed). Memory 212 may be configured to store one or more threshold levels for the percentage of vehicles that fail a test of surveillance messages to result in a determination that GNSS interference has occurred. Memory 212 may be configured to store one or more threshold distances and/or an algorithm for determining threshold distances for determining that reported position is outside of an acceptable range from a predicted position. Memory 212 may be configured to further store an acceptable time window and/or an algorithm for determining acceptable time window for determining that a round-trip time indicates a discrepancy in a surveillance message. Memory 212 may be configured to also store alert signals, warning signals, and/or other outputs via user interface 230 and/or transceiver 220.

Transceiver 220 is configured to receive a surveillance message from other vehicles and non-moving transmitters via antenna 222. Transceiver 220 may include an ADS-B transceiver, a TCAS transceiver, a transponder, and/or any other type of transmitter and/or receiver. In some examples, transceiver 220 transmits an interrogation message requesting data from other vehicles. Transceiver 220 then waits to receive one or more reply messages from the other vehicles. Antenna 222 may include one or more antenna elements, such as patch antennas integrated onto a circuit board, top-hat antennas, phased-array antennas, and/or any other type of antenna elements.

Positioning device 240 is configured to determine the position or location of vehicle 200. Vehicle 200 can include two or more positioning devices for redundancy and cross-checking, in some examples. Positioning device 240 may include satellite navigation equipment such as a GNSS configured to receive positioning signals from satellites and other transmitters. One example of a GNSS is a Global Positioning System (GPS). In some examples, positioning device 240 is configured to deliver the received positioning signals to processing circuitry 210, which may be configured to determine the position of vehicle 200. Processing circuitry 210 may be configured to detect GNSS interference by determining that positioning device 240 has received interfered signals and/or by determining that a target vehicle has received interfered signals.

In examples in which system 202 includes an INS, the INS may be configured to determine the velocity and/or orientation of vehicle 200. To determine the orientation of vehicle 200, the INS may be configured to determine the pitch, roll, and yaw of vehicle 200. In some examples, the INS can also determine the relative position of vehicle 200 using dead reckoning. System 202 may also include sensors such as one or more accelerometers (angular and/or linear accelerometers), one or more gyroscopes, one or more magnetic sensors, one or more speed sensors, and/or an altimeter. Some or all of the sensors, such as one or more accelerometers and/or one or more gyroscopes, may be part of an INS or may provide data to an INS.

Figure 3:
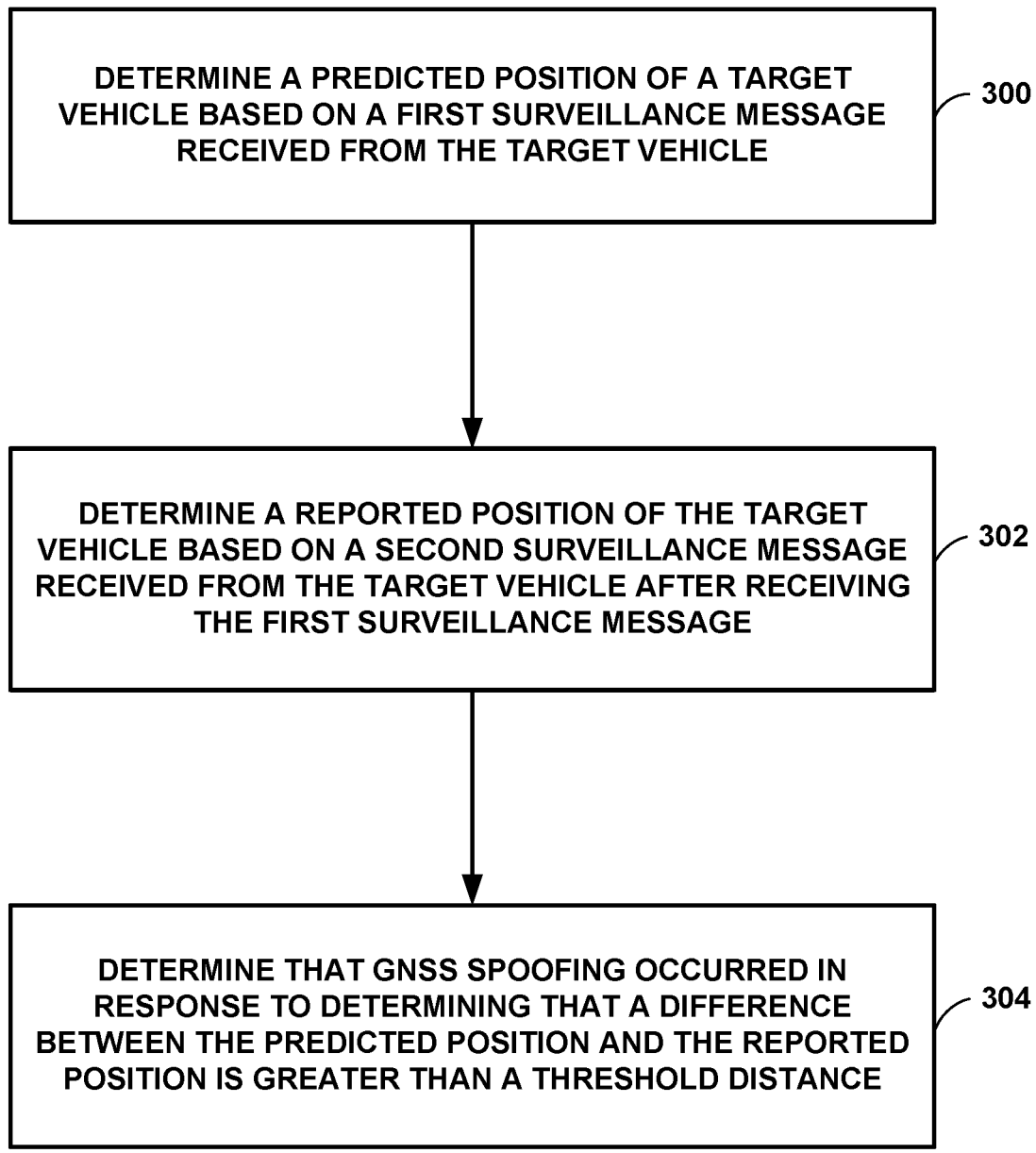
FIGS. 3-5 are flowcharts illustrating example processes for determining that Global Navigation Satellite System interference has occurred, in accordance with some examples of this disclosure.
Figure 4:
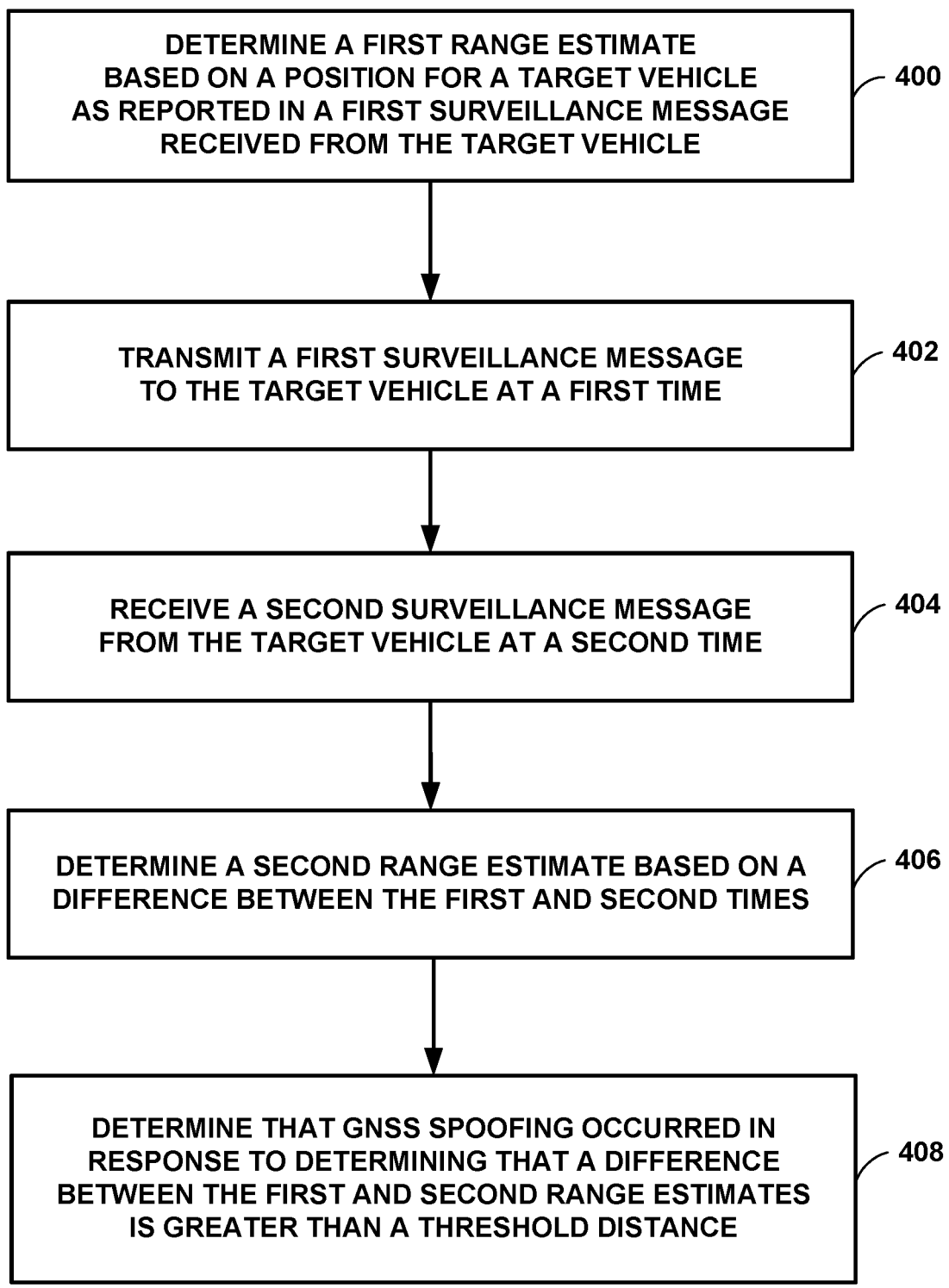
Figure 5:
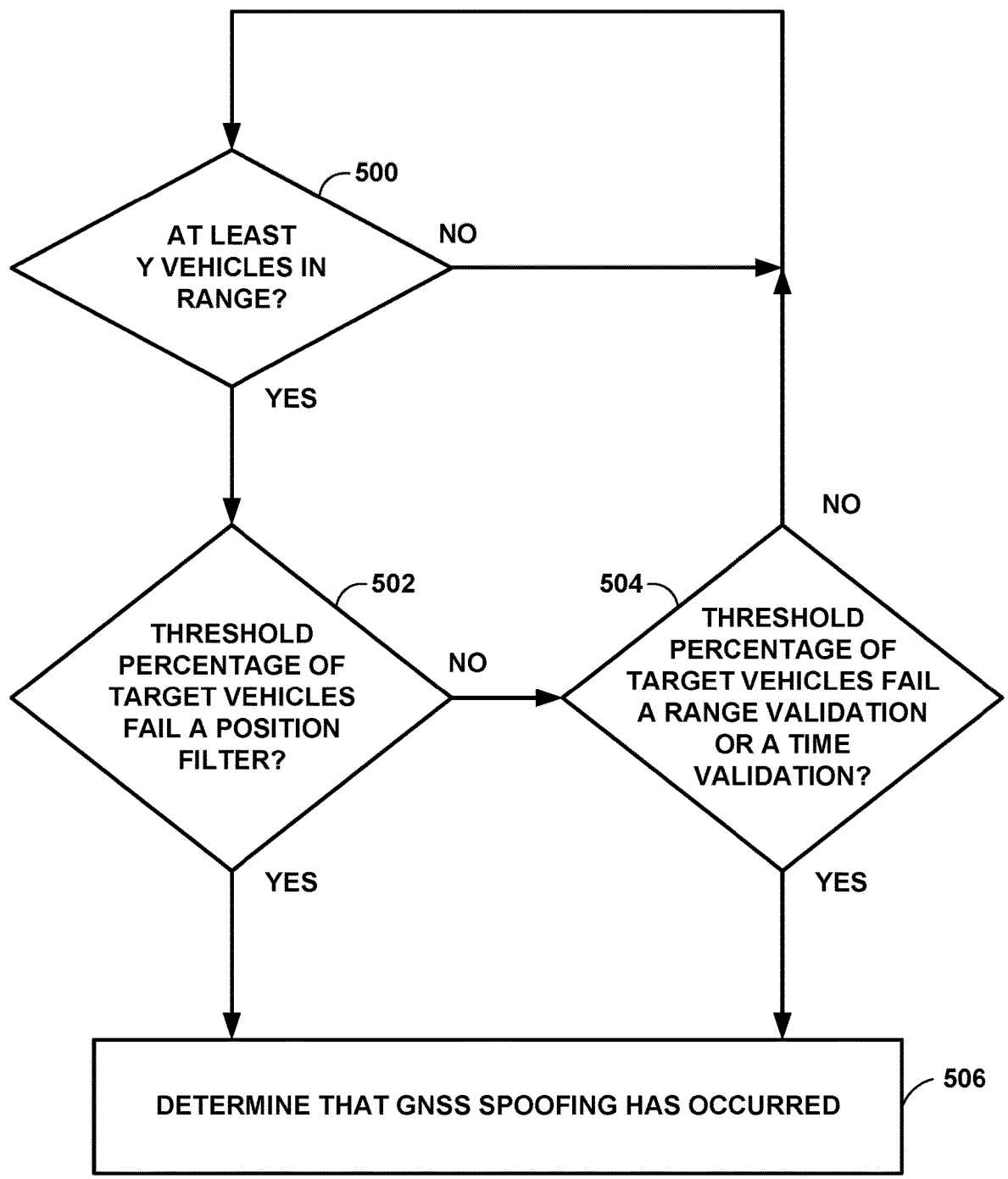

FIGS. 3-5 are flowcharts illustrating example processes for determining that GNSS interference has occurred, in accordance with some examples of this disclosure. The example processes of FIGS. 3-5 is described with reference to a system mounted onboard vehicle 100 shown in FIG. 1, although other components may exemplify similar techniques.

FIG. 3 depicts a process for implementing a position filter to determine whether a surveillance message includes a discrepancy. FIG. 4 depicts a process for performing a time validation to determine whether a surveillance message includes a discrepancy. FIG. 5 depicts a process for implementing a position filter and time validation or a range validation to determine whether a surveillance message includes a discrepancy. Performing a range validation test may include converting from geodesic coordinates to spherical coordinates if two surveillance protocols are used (e.g., TCAS and ADS-B).

The techniques of FIGS. 3-5 may be used to detect either a jump or a drift in the reported positions or round-trip times for any of vehicles 160A-160N. A position jump is a sudden change in position, different from the change that occurs as the vehicle travels, such as a jump of more than one, two, or three kilometers in less than one or two seconds. A position drift is a gradual change in position away from the actual position or track of the vehicle. For example, as vehicle 160A moves relative to GNSS spoofer 140, the error in the position of vehicle 160A as determined by a positioning device onboard vehicle 160A may gradually change, where the error is caused by spoofed signals 150.

A system configured to implement any of the processes depicted in FIG. 3-5 may reside in a surveillance device, a positioning device, a terrain awareness system, a collision awareness system, a collision avoidance system, a navigation system, a travel management system, and/or a proximity warning system. In some examples, the system may be configured to implement two or more of the functions listed above, such as a combined terrain awareness warning system and ground proximity warning system, which can be optionally combined with a TCAS device, for example. Thus, a system configured to implement any of the processes depicted in FIG. 3-5 may reside in the same housing as a terrain awareness warning system, a ground proximity warning system, a surveillance device, and/or a positioning device, and the systems may be integrated in common processing circuitry and/or distributed across separate processing circuitry.

In the example of FIG. 3, a system onboard vehicle 100 determines a predicted position of target vehicle 160A based on a first surveillance message received from target vehicle 160A (300). The first surveillance message from target vehicle 160A (e.g., surveillance message 170A) may include data indicating the position and velocity (e.g., speed and direction) of target vehicle 160A. In some examples, the system onboard vehicle 100 is configured to determine the position, speed, and direction of travel of vehicle 160A based on a surveillance message received from vehicle 160A, The system onboard vehicle 100 may be configured to predict a future position of vehicle 160A by plotting out or extrapolating the velocity vector of vehicle 160A into the future, for example, from raw measurements via a filter or using data fusion technology. The predicted position may represent where vehicle 160A is expected to be located after a particular time duration, assuming that the velocity vector of vehicle 160A remains constant or changes based on a maneuver indicated in a surveillance message received from vehicle 160A. In examples in which vehicle 160A transmits surveillance messages every five seconds, the predicted position may represent where vehicle 160A is expected to be located at the time of next transmission (e.g., after five seconds).

In the example of FIG. 3, the system onboard vehicle 100 determines a reported position of target vehicle 160A based on a second surveillance message received from target vehicle 160A after receiving the first surveillance message (302). The second surveillance message may include data indicating the position of target vehicle 160A at the time that vehicle 160A transmitted the second surveillance message. In some examples, the first and second surveillance messages are broadcast messages, such as two ADS-B messages transmitted at regular intervals.

In the example of FIG. 3, the system onboard vehicle 100 determines that GNSS interference occurred in response to determining that a difference between the predicted position and the reported position is greater than a threshold distance (304). The system can determine the threshold distance as a radius around the predicted position that represents an acceptable range of error. The system may be configured to determine the threshold distance based on the velocity of vehicle 160A and the time between the first and second surveillance messages. For example, as the speed of vehicle 160A increases, the system may be configured to determine a longer threshold distance, which is known as a "correlation window" in TCAS protocol. Moreover, as the time between surveillance messages increases, the system may be configured to determine a longer threshold distance. The system may be configured to implement a Kalman filter or an alpha-beta filter to determine to perform the techniques shown in the flowchart of FIG. 3.

The system may be configured to implement the position filter for each surveillance message received from vehicle 160A. Alternatively, the system may be configured to implement the position filter at a predetermined rate (e.g., once every second or every three seconds). The system may be configured to also increase the rate for implementing the position filter for vehicle 160A in response to determining that a surveillance message from vehicle 160A or another vehicle has a discrepancy.

In response to determining that a difference between the reported position of vehicle 160A and the predicted position is less than a threshold distance, the system onboard vehicle 100 may be configured to update the predicted position for the next surveillance message that will be received in the future. In response to determining that a difference between the reported position of vehicle 160A and the predicted position is greater than a threshold distance, the system onboard vehicle 100 may be configured to determine that GNSS interference has occurred. Additionally or alternatively, the system may be configured to determine that GNSS interference has occurred when at least a threshold percentage (e.g., X out of Y target vehicles) of transmitting vehicles has a reported position that is at least a threshold distance from a predicted position.

Additionally or alternatively, a system onboard vehicle 100 can use a round-trip time for surveillance messages traveling between vehicles 100 and 160A to validate a position reported by vehicle 160A. In response to determining that the reported position fails the validation, the system may be configured to determine that GNSS interference has occurred. In the example of FIG. 4, the system onboard vehicle 100 determines a first range estimate based on position reported by target vehicle 160A in, for example surveillance message 170A (400). Surveillance message 170A from target vehicle 160A encode position data for target vehicle 160A. Based on this position data for vehicle 160A and the position of vehicle 100 (e.g., determined using a positioning device), the system may be configured to determine an estimate of the distance between vehicles 100 and 160A (e.g., the range from vehicle 100 to vehicle 160A). For a time validation test, the system can multiply this range estimate from vehicle 100 to vehicle 160A by two for the round trip and divide by the propagation speed of surveillance signals (e.g., the speed of light) to determine a predicted round-trip time. The system may be configured to add time for an expected latency of the reply message transmitted by vehicle 160A. The system may also be configured to determine the acceptable time window that includes the expected round-trip time. For example, if the expected round-trip time is one hundred microseconds, the system may determine the acceptable time window as including a range from ninety microseconds to one hundred and ten microseconds.

In the example of FIG. 4, the system onboard vehicle 100 transmits a first surveillance message to target vehicle 160A at a first time (402) and receives a second surveillance message from target vehicle 160A at a second time (404). The first surveillance message may be an interrogation message requesting a reply from vehicle 160A, and the second surveillance message may be a reply message in response to the interrogation message. In some examples, the system determines a second range estimate from vehicle 100 to vehicle 160A based on a difference between the first and second times (406) by multiplying the time difference by the propagation speed and dividing by two. The system may also subtract time for a latency of the transceiver onboard target vehicle 160A in replying to the interrogation message. The difference between the first and second times is known the time of arrival for the reply message even though that time difference also includes the travel time of the interrogation message and may include any latency introduced by the transceiver onboard vehicle 160A.

In the example of FIG. 4, the system onboard vehicle 100 determines that GNSS interference occurred in response to determining that a difference between the first and second range estimates is greater than a threshold distance (406). Additionally or alternatively, the system may be configured to compare the round-trip time to an acceptable time window to determine whether GNSS interference has occurred.

In some examples, the system may be configured to determine that GNSS interference has occurred when at least a threshold percentage of vehicles have a difference in range estimates that is greater than a threshold distance. Additionally or alternatively, the system may be configured to determine that GNSS interference has occurred when at least a threshold percentage of vehicles have a time difference outside of an acceptable time window that is determined based on the position reported by the vehicle. In addition to being used for detecting GNSS interference, the validation techniques shown in FIG. 4 may also be used to validate reported positions for safety-critical applications such as collision avoidance systems.

FIG. 4 depicts an example of the use of range and propagation time for validating the reported position of vehicle 160A. Additionally or alternatively, the system onboard vehicle 100 may be configured to use the bearing or angle of arrival of surveillance message 170A to validate the reported position of vehicle 160A. For example, the system may determine a discrepancy for surveillance message 170A in response to determining that the reported position of vehicle 160A is east of vehicle 100 but the angle of arrival or bearing indicates that vehicle 160A is west of vehicle 100. In some examples, the system may be configured to determine first and second bearing estimates based on a single surveillance message using the position reported in the single surveillance message and the angle of arrival. Additionally or alternatively, the system may be configured to determine the first bearing estimate based on a position reported in a first surveillance message by, for example, converting cartesian coordinates to bearing and range. In some examples, the system may be configured to determine the second bearing estimate on an angle of arrival of a second surveillance message. The first surveillance message may be a broadcast message (e.g., an ADS-B message), and the second surveillance message may be reply message (e.g., a transponder reply message in response to a TCAS interrogation).

In the example of FIG. 5, the system onboard vehicle 100 determines whether there are at least Y vehicles within range of a transceiver onboard vehicle 100 (500). The system may be configured to determine whether there are at least Y vehicles within range, where Y is an integer such as one, two, three, four, five, or any other integer. The system may be configured to implement the techniques shown in FIG. 5 when there are a sufficient number of vehicles in range to make a reasonable determination of whether GNSS interference has occurred.

In the example of FIG. 5, in response to determining that there are at least Y vehicles in range, the system onboard vehicle 100 determines whether a threshold percentage of target vehicle fail a position filter (502). One example of a position filter is depicted in FIG. 3, where the system determines whether a reported position is sufficiently close to a predicted position determined based on a previously reported position. The threshold percentage may be X or W out of the Y vehicles or a specific percentage (e.g., 50%, 60%, 65%, 70%, 75%, 80%, 90%, or 100%). In some examples, the threshold percentage is greater than fifty percent, greater than sixty percent, greater than seventy percent, or greater than eighty percent.

In the example of FIG. 5, in response to determining that less than the threshold percentage of target vehicles fail the position filter, the system onboard vehicle 100 determines whether a threshold percentage of target vehicles 160A-160N fail a time validation or range validation (504). The system may be configured to perform a time validation or a range validation or a time validation using the techniques described with respect to FIG. 4. Additionally or alternatively, the system may be configured to perform a time validation or a range validation or a time validation by comparing the reported position for each of target vehicles 160A-160N to a round-trip time for the respective one of target vehicles 160A-160N.

Although FIG. 5 depicts the position filter (502) as performed before the time validation or range validation (504), the order of steps 502 and 504 may be reversed. In addition, the threshold percentage for the position filter may be the same as or different from the threshold percentage for the time validation or range validation. In a first instance, X out of Y target vehicle may fail the position filter but not fail the time validation or range validation, while in a second instance W out of Y target vehicle may fail the time validation or range validation but not fail the position filter. Thus, implementing both test may help detect instances of GNSS interference.

In response to determining that a threshold percentage of vehicles 160A-160N fail the position filter, or in response to determining that a threshold percentage of vehicles 160A-160N fail the time validation or the range validation, the system onboard vehicle 100 determines that GNSS interference has occurred (506). The system can make this determination by determining that vehicle 100 and/or some or all of vehicles 160A-160N have received spoofed GNSS signals 150 from GNSS spoofer 140 or have received unintentionally interfered GNSS signals.

In response to determining that less than a threshold percentage of vehicles 160A-160N fail the position filter and less than a threshold percentage of vehicles 160A-160N fail the time validation or range validation, the system onboard vehicle 100 returns to the determination of whether there are sufficient vehicles in range (500). The system may also be configured to update the position filters for the vehicles that did not fail the position filter or the validation. The reported positions that fail the validation or filter may not be used to update the position filter.

By implementing tests such as position filters and validations, the system onboard vehicle 100 can cross-check the positions reported by vehicles 160A-160N. If the reported position fails any of the cross-checks, the system may determine that the surveillance message in which the position was reported includes a discrepancy. However, the reported position may be accurate in examples in which vehicle 100 received interfered GNSS signals 150 but the transmitting target vehicle has not received any interfered GNSS signals. Therefore, even if the system determines that the surveillance message has a discrepancy, the source of the discrepancy may be in an estimated position of vehicle 100, as determined by a positioning device onboard vehicle 100. The system may use the estimated position of vehicle 100 in the position filter, time validation, and range validation, such that spoofed signals 150 or otherwise interfered GNSS signals can cause vehicle 100 to determine that surveillance messages 170A-170N include a discrepancy even if target vehicles 160A-160N have not received spoofed signals 150 or otherwise interfered GNSS signals.

The following numbered examples demonstrate one or more aspects of the disclosure.

Example 1. A method includes receiving, by a transceiver, surveillance messages from Y target vehicles, wherein Y is an integer greater than two. The method also includes receiving, by the transceiver, a second set of surveillance messages from the Y target vehicles after receiving the first set of surveillance messages. The method further includes determining, by processing circuitry, predicted positions of the Y target vehicles based on the first set of surveillance messages. The method includes determining, by the processing circuitry, reported positions of the Y target vehicles based on the second set of surveillance messages. The method also includes determining, by the processing circuitry, that respective differences between the respective predicted position and the respective reported position for X of the Y target vehicles is greater than a threshold distance. The method includes determining, by the processing circuitry, that GNSS interference has occurred in response to determining that X divided by Y is greater than a first threshold level.

Example 2. A method includes receiving, by a transceiver, a first surveillance message from a target vehicle. The method also includes receiving, by the transceiver, a second surveillance message from the target vehicle after receiving the first surveillance message. The method further includes determining, by processing circuitry, a predicted position of the target vehicle based on the first surveillance message. The method includes determining, by the processing circuitry, a reported position of the target vehicle based on the second surveillance message. The method also includes determining, by the processing circuitry, that a difference between the predicted position and the reported position for the target vehicle is greater than a threshold distance. The method includes determining, by the processing circuitry, that GNSS interference has occurred in response to determining that the difference between the predicted position and the reported position is greater than the threshold distance.

Example 3. A method includes receiving, by a transceiver, surveillance messages from Y target vehicles, wherein Y is an integer greater than two, transmitting, by the transceiver, one or more interrogation messages to the Y target vehicles, and receiving, by the transceiver, a set of reply messages from the Y target vehicles. The method also includes determining, by processing circuitry, reported positions of the Y target vehicles based on the first set of surveillance messages. The method further includes determining, by the processing circuitry, a first set of range estimates for the Y target vehicles based on the reported positions of the Y target vehicles. The method includes determining, by the processing circuitry, a second set of range estimates for the Y target vehicles based on round-trip times for each interrogation message of the one or more interrogation messages and each respective message of the set of reply messages. The method also includes determining, by the processing circuitry, that a difference between a first respective range estimate of the first set of range estimates and a second respective range estimate of the second set of range estimates for W of the Y target vehicles is greater than a threshold distance. The method further includes determining that GNSS interference has occurred in response to determining that W divided by Y is greater than a second threshold level.

Example 4. A method includes receiving, by a transceiver, a first surveillance message from a target vehicle, transmitting, by the transceiver, an interrogation message to the target vehicle, and receiving, by the transceiver, a reply messages from the target vehicle. The method also includes determining, by processing circuitry, a reported position of the target vehicle based on the first surveillance message. The method further includes determining, by the processing circuitry, a first range estimate for the target vehicle based on the reported position of the target vehicle. The method includes determining, by the processing circuitry, a second range estimate for the target vehicle based on a round-trip time for the interrogation message and the reply message. The method also includes determining, by the processing circuitry, that a difference between the first range estimate and the second range estimate for the target vehicle is greater than a threshold distance. The method further includes determining that GNSS interference has occurred in response to determining that the difference between the first and second range estimates is greater than the threshold distance.

Example 5. The method of any combination of the preceding examples.

Example 6. The method of the preceding examples or any combination thereof, further including outputting a warning signal in response to determining that GNSS interference has occurred in a first instance.

Example 7. The method of the preceding examples or any combination thereof, further including refraining from outputting the warning signal in response to determining that GNSS interference has not occurred in a second instance.

Example 8. The method of the preceding examples or any combination thereof, further including determining a first set of bearing estimates for the Y target vehicles based on the reported positions of the Y target vehicles.

Example 9. The method of the preceding examples or any combination thereof, further including determining a second set of bearing estimates for the Y target vehicles based on angles of arrival for each respective message of the set of reply messages.

Example 10. The method of the preceding examples or any combination thereof, further including determining a second set of bearing estimates for the Y target vehicles based on angles of arrival for each respective message of the second set of surveillance messages.

Example 11. The method of the preceding examples or any combination thereof, further including determining that a difference between a first respective bearing estimate of the first set of bearing estimates and a second respective bearing estimate of the second set of bearing estimates for Z of the Y target vehicles is greater than a threshold angle.

Example 12. The method of the preceding examples or any combination thereof, further including determining that a second instance of GNSS interference has occurred in response to determining that Z divided by Y is greater than a third threshold level.

Example 13. The method of the preceding examples or any combination thereof, further including receiving GNSS signals and determine a position of the system based on the GNSS signals.

Example 14. The method of the preceding examples or any combination thereof, further including determining that the positioning device received interfered GNSS signals in response to determining that X divided by Y is greater than the first threshold level.

Example 15. The method of the preceding examples or any combination thereof, further including determining that the positioning device received interfered GNSS signals in response to determining that W divided by Y is greater than the second threshold level.

Example 16. The method of the preceding examples or any combination thereof, further including determining that the positioning device received interfered GNSS signals in response to determining that Z divided by Y is greater than the third threshold level.

Example 17. The method of the preceding examples or any combination thereof, wherein determining a predicted position of a target vehicle includes determining a current position, a speed, and a direction of travel of the target vehicle.

Example 18. The method of the preceding examples or any combination thereof, wherein determining a predicted position of a target vehicle includes determining the predicted position based on the current position, the speed, and the direction of travel of the target vehicle using a Kalman filter or an alpha-beta filter.

Example 19. The method of the preceding examples or any combination thereof, further including implementing, by the processing circuitry, a terrain awareness and warning system.

Example 20. The method of the preceding examples or any combination thereof, further including implementing, by the processing circuitry, a ground proximity warning system.

Example 21. The method of the preceding examples or any combination thereof, wherein receiving a surveillance message includes receiving an ADS-B message.

Example 22. The method of the preceding examples or any combination thereof, wherein the transceiver and processing circuitry are mounted on an ownship vehicle.

Example 23. A system including a transceiver and processing circuitry configured to perform the method of the preceding examples or any combination thereof.

Example 24. A system includes a transceiver configured to receive surveillance messages from Y target vehicles, where Y is an integer greater than two. The system includes processing circuitry configured to determine predicted positions of the Y target vehicles based on the surveillance messages. The processing circuitry is also configured to determine reported positions of the Y target vehicles based on later received surveillance messages. The processing circuitry is further configured to determine that respective differences between the respective predicted position and the respective reported position for X of the Y target vehicles is greater than a threshold distance. The processing circuitry is configured to determine that GNSS interference has occurred in response to determining that X divided by Y is greater than a first threshold level.

Example 25. A system includes a transceiver configured to receive first and second surveillance messages from a target vehicle. The system includes processing circuitry configured to determine predicted positions of the target vehicle based on the first surveillance message. The processing circuitry is also configured to determine a reported positions of the target vehicle based on a second surveillance message. The processing circuitry is further configured to determine that a respective difference between the predicted position and the reported position for the target vehicle is greater than a threshold distance. The processing circuitry is configured to determine that GNSS interference has occurred in response to determining that the respective difference between the predicted position and the reported position for the target vehicle is greater than the threshold distance.

Example 26. A system includes a transceiver configured to receive surveillance messages from Y target vehicles, where Y is an integer greater than two. The transceiver is also configured to transmit one or more interrogation messages to the Y target vehicles and receive a set of reply messages from the Y target vehicles. The system includes processing circuitry configured to determine reported positions of the Y target vehicles based on the first set of surveillance messages. The processing circuitry is also configured to determine a first set of range estimates for the Y target vehicles based on the reported positions of the Y target vehicles. The processing circuitry is further configured to determine a second set of range estimates for the Y target vehicles based on round-trip times for each interrogation message of the one or more interrogation messages and each respective message of the set of reply messages. The processing circuitry is configured to determine that a difference between a first respective range estimate of the first set of range estimates and a second respective range estimate of the second set of range estimates for W of the Y target vehicles is greater than a threshold distance. The processing circuitry is configured to determine that GNSS interference has occurred in response to determining that W divided by Y is greater than a second threshold level.

Example 27. A system includes a transceiver configured to receive a first surveillance message from a target vehicle, transmit an interrogation message to the target vehicle, and receive a reply message from the target vehicle. The system includes processing circuitry configured to determine a reported position of the target vehicle based on the first surveillance message. The processing circuitry is also configured to determine a first range estimate for the target vehicle based on the reported position of the target vehicle. The processing circuitry is further configured to determine a second range estimate for the target vehicle based on a round-trip time for the interrogation message and the reply message. The processing circuitry is configured to determine that a difference between the first range estimate and the second range estimate is greater than a threshold distance. The processing circuitry is configured to determine that GNSS interference has occurred in response to determining that the difference between the first range estimate and the second range estimate is greater than the threshold distance.

Example 28. The system of examples 23-26 or any combination thereof, where the processing circuitry is further configured to output a warning signal in response to determining that GNSS interference has occurred in a first instance.

Example 29. The system of examples 23-27 or any combination thereof, where the processing circuitry is further configured to refrain from outputting the warning signal in response to determining that GNSS interference has not occurred in a second instance.

Example 30. The system of examples 23-28 or any combination thereof, where the processing circuitry is further configured to determine a first set of bearing estimates for the Y target vehicles based on the reported positions of the Y target vehicles.

Example 31. The system of examples 23-29 or any combination thereof, where the processing circuitry is further configured to determine a second set of bearing estimates for the Y target vehicles based on angles of arrival for each respective message of the set of reply messages.

Example 32. The system of examples 23-30 or any combination thereof, where the processing circuitry is further configured to determine a second set of bearing estimates for the Y target vehicles based on angles of arrival for each respective message of the second set of surveillance messages.

Example 33. The system of examples 23-31 or any combination thereof, where the processing circuitry is further configured to determine that a difference between a first respective bearing estimate of the first set of bearing estimates and a second respective bearing estimate of the second set of bearing estimates for Z of the Y target vehicles is greater than a threshold angle.

Example 34. The system of examples 23-32 or any combination thereof, where the processing circuitry is further configured to determine that a second instance of GNSS interference has occurred in response to determining that Z divided by Y is greater than a third threshold level.

Example 35. The system of examples 23-33 or any combination thereof, further including a positioning device configured to receive GNSS signals and determine a position of the system based on the GNSS signals.

Example 36. The system of examples 23-34 or any combination thereof, where the processing circuitry is further configured to determine that the positioning device received interfered GNSS signals in response to determining that X divided by Y is greater than the threshold level.

Example 37. The system of examples 23-35 or any combination thereof, where the processing circuitry is configured to determine a current position, a speed, and a direction of travel of the target vehicle.

Example 38. The system of examples 23-36 or any combination thereof, where the processing circuitry is further configured to determine a predicted position of a target vehicles based on the current position, the speed, and the direction of travel of the target vehicle using a Kalman filter or an alpha-beta filter.

Example 39. The system of examples 23-37 or any combination thereof, where the processing circuitry is further configured to implement a terrain awareness and warning system.

Example 40. The system of examples 23-38 or any combination thereof, where the processing circuitry is further configured to implement a ground proximity warning system.

Example 41. The system of examples 23-39 or any combination thereof, wherein the transceiver is configured to receive ADS-B messages.

Example 42. The system of examples 23-40 or any combination thereof, wherein the transceiver is configured to receive TCAS interrogation messages.

Example 43. The system of examples 23-41 or any combination thereof, wherein the transceiver is configured to receive transponder messages.

Example 44. The system of examples 23-42 or any combination thereof, where the system is configured to mount on an ownship vehicle.

Example 45. A device includes a computer-readable medium having executable instructions stored thereon, configured to be executable by processing circuitry for causing the processing circuitry to perform the method of examples 1-22 or any combination thereof.

Example 46. A system comprising means for performing each of the method steps of examples 1-22 or any combination thereof.

This disclosure has attributed functionality to vehicles 100 and 200, system 202, processing circuitry 210, memory 212, transceiver 220, and positioning device 240 may include any combination of integrated circuitry, discrete logic circuitry, analog circuitry. For example, processing circuitry 210 may include one or more processors. In some examples, vehicles 100 and 200, system 202, processing circuitry 210, memory 212, transceiver 220, and positioning device 240 may include multiple components, such as any combination of one or more microprocessors, one or more DSPs, one or more ASICs, or one or more FPGAs, as well as other discrete or integrated logic circuitry, and/or analog circuitry. The techniques described in this disclosure may also be encoded in a non-transitory computer-readable storage medium, such as a memory coupled to vehicles 100 and 200, system 202, processing circuitry 210, memory 212, transceiver 220, and positioning device 240. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system comprising:
  a transceiver configured to:
    receive a first set of surveillance messages from Y target vehicles, wherein Y is an integer greater than two; and
    receive a second set of surveillance messages from the Y target vehicles after receiving the first set of surveillance messages; and
  processing circuitry configured to:
    determine predicted positions of the Y target vehicles based on the first set of surveillance messages;
    determine reported positions of the Y target vehicles based on the second set of surveillance messages;
    determine that respective differences between the respective predicted position and the respective reported position for X of the Y target vehicles is greater than a threshold distance; and
    determine that Global Navigation Satellite System (GNSS) interference has occurred in response to determining that X divided by Y is greater than a threshold level.

2. The system of claim 1, wherein the processing circuitry is configured to:
  output a warning signal in response to determining that GNSS interference has occurred in a first instance; and
  refrain from outputting the warning signal in response to determining that GNSS interference has not occurred in a second instance.

3. The system of claim 1,
  wherein the threshold distance is a first threshold distance,
  wherein the processing circuitry is configured to determine that the GNSS interference has occurred by determining that a first instance of GNSS interference has occurred in response to determining that X divided by Y is greater than a first threshold level, and
  wherein the transceiver is configured to:
    transmit one or more interrogation messages to the Y target vehicles; and
    receive a set of reply messages from the Y target vehicles, and
  wherein the processing circuitry is further configured to:
    determine a first set of range estimates for the Y target vehicles based on the reported positions of the Y target vehicles;
    determine a second set of range estimates for the Y target vehicles based on round-trip times for each interrogation message of the one or more interrogation messages and each respective message of the set of reply messages;
    determine that a difference between a first respective range estimate of the first set of range estimates and a second respective range estimate of the second set of range estimates for W of the Y target vehicles is greater than a second threshold distance; and determine that a second instance of GNSS interference has occurred in response to determining that W divided by Y is greater than a second threshold level.

4. The system of claim 1,
wherein the processing circuitry is configured to determine that the GNSS interference has occurred by determining that a first instance of GNSS interference has occurred in response to determining that X divided by Y is greater than a first threshold level,
wherein the transceiver is configured to:
transmit one or more interrogation messages to the Y target vehicles; and
receive a set of reply messages from the Y target vehicles, and
wherein the processing circuitry is further configured to:
determine a first set of bearing estimates for the Y target vehicles based on the reported positions of the Y target vehicles;
determine a second set of bearing estimates for the Y target vehicles based on angles of arrival for each respective message of the set of reply messages;
determine that a difference between a first respective bearing estimate of the first set of bearing estimates and a second respective bearing estimate of the second set of bearing estimates for W of the Y target vehicles is greater than a threshold angle; and
determine that a second instance of GNSS interference has occurred in response to determining that W divided by Y is greater than a second threshold level.

5. The system of claim 1,
wherein the processing circuitry is configured to determine that the GNSS interference has occurred by determining that a first instance of GNSS interference has occurred in response to determining that X divided by Y is greater than a first threshold level,
wherein the processing circuitry is further configured to:
determine a first set of bearing estimates for the Y target vehicles based on the reported positions of the Y target vehicles;
determine a second set of bearing estimates for the Y target vehicles based on the second angles of arrival for each respective message of the second set of surveillance messages;
determine that a difference between a first respective bearing estimate of the first set of bearing estimates and a second respective bearing estimate of the second set of bearing estimates for W of the Y target vehicles is greater than a threshold angle; and
determine that a second instance of GNSS interference has occurred in response to determining that W divided by Y is greater than a second threshold level.

6. The system of claim 1, further comprising a positioning device configured to receive GNSS signals and determine a position of the system based on the GNSS signals,
wherein the processing circuitry is configured to determine that the positioning device received interfered GNSS signals in response to determining that X divided by Y is greater than the threshold level.

7. The system of claim 1, wherein the processing circuitry is configured to determine the predicted positions of the Y target vehicles by:
determining a respective current position, a respective speed, and a respective direction of travel of each of the Y target vehicles; and
determining the respective predicted position based on the respective current position, the respective speed, and the respective direction of travel of each of the Y target vehicles using a Kalman filter or an alpha-beta filter.

8. The system of claim 1, wherein the processing circuitry is configured to:
implement a terrain awareness and warning system; or
implement a ground proximity warning system.

9. The system of claim 1,
wherein the transceiver is configured to receive the first set of surveillance messages by receiving a first set of automatic-dependent surveillance-broadcast (ADS-B) messages, and
wherein the transceiver is configured to receive the second set of surveillance messages by receiving a second set of ADS-B messages.

10. The system of claim 1, wherein the system is configured to mount on an ownship vehicle.

11. A method comprising:
receiving, by a transceiver, a first set of surveillance messages from Y target vehicles, wherein Y is an integer greater than two;
receiving, by the transceiver, a second set of surveillance messages from the Y target vehicles after receiving the first set of surveillance messages;
determining, by processing circuitry, predicted positions of the Y target vehicles based on the first set of surveillance messages;
determining, by the processing circuitry, reported positions of the Y target vehicles based on the second set of surveillance messages;
determining, by the processing circuitry, that respective differences between the respective predicted position and the respective reported position for X of the Y target vehicles is greater than a threshold distance; and
determining, by the processing circuitry, that Global Navigation Satellite System (GNSS) interference has occurred in response to determining that X divided by Y is greater than a threshold level.

12. The method of claim 11, further comprising:
outputting a warning signal in response to determining that GNSS interference has occurred in a first instance; and
refraining from outputting the warning signal in response to determining that GNSS interference has not occurred in a second instance.

13. The method of claim 11,
wherein the threshold distance is a first threshold distance,
wherein determining that the GNSS interference has occurred comprises determining that a first instance of GNSS interference has occurred in response to determining that X divided by Y is greater than a first threshold level, and
wherein the method further comprises:
transmitting one or more interrogation messages to the Y target vehicles;
receiving a set of reply messages from the Y target vehicles;
determining a first set of range estimates for the Y target vehicles based on the reported positions of the Y target vehicles;
determining a second set of range estimates for the Y target vehicles based on round-trip times for each interrogation message of the one or more interrogation messages and each respective message of the set of reply messages;
determining that a difference between a first respective range estimate of the first set of range estimates and a second respective range estimate of the second set of range estimates for W of the Y target vehicles is greater than a second threshold distance; and determining that a second instance of GNSS interference has occurred in response to determining that W divided by Y is greater than a second threshold level.

14. The method of claim 11, wherein determining that the GNSS interference has occurred comprises determining that a first instance of GNSS interference has occurred in response to determining that X divided by Y is greater than a first threshold level, and wherein the method further comprises:
transmitting one or more interrogation messages to the Y target vehicles;

receiving a set of reply messages from the Y target vehicles;

determining a first set of bearing estimates for the Y target vehicles based on the reported positions of the Y target vehicles;

determining a second set of bearing estimates for the Y target vehicles based on angles of arrival for each respective message of the set of reply messages;

determining that a difference between a first respective bearing estimate of the first set of bearing estimates and a second respective bearing estimate of the second set of bearing estimates for W of the Y target vehicles is greater than a second threshold angle; and determining that a second instance of GNSS interference has occurred in response to determining that W divided by Y is greater than a second threshold level.

15. The method of claim 11, further comprising:
receiving, by a positioning device, GNSS signals;
determining a position of the positioning device based on the GNSS signals; and
determining that the positioning device received interfered GNSS signals in response to determining that the difference between the predicted position and the reported position is greater than the threshold distance.

16. The method of claim 11, wherein determining the predicted positions of the Y target vehicles comprises:
determining a respective current position, a respective speed, and a respective direction of travel of each of the Y target vehicles; and
determining the respective predicted position based on the respective current position, the respective speed, and the respective direction of travel of each of the Y target vehicles using a Kalman filter or an alpha-beta filter.

17. A system comprising:
a transceiver configured to:
receive a first set of surveillance messages from Y target vehicles, wherein Y is an integer greater than two;
transmit one or more interrogation messages to the Y target vehicles; and
receive a set of reply messages from the Y target vehicles; and processing circuitry configured to:
determine reported positions of the Y target vehicles based on the first set of surveillance messages;
determine a first set of range estimates for the Y target vehicles based on the reported positions of the Y target vehicles;
determine a second set of range estimates for the Y target vehicles based on round-trip times for each interrogation message of the one or more interrogation messages and each respective message of the set of reply messages;
determine that a difference between a first respective range estimate of the first set of range estimates and a second respective range estimate of the second set of range estimates for X of the Y target vehicles is greater than a threshold distance; and
determine that Global Navigation Satellite System (GNSS) interference has occurred in response to determining that X divided by Y is greater than a threshold level.

18. The system of claim 17, wherein the processing circuitry is configured to:
output a warning signal in response to determining that GNSS interference has occurred in a first instance; and
refrain from outputting the warning signal in response to determining that GNSS interference has not occurred in a second instance.

19. The system of claim 17, further comprising a positioning device configured to receive GNSS signals and determine a position of the system based on the GNSS signals,
wherein the processing circuitry is configured to determine that the positioning device received interfered GNSS signals in response to determining that X divided by Y is greater than the threshold level.

20. The system of claim 17, wherein the processing circuitry is configured to:
implement a terrain awareness and warning system; or
implement a ground proximity warning system.

* * * * *